US008798374B2

(12) United States Patent
Bartlett et al.

(10) Patent No.: US 8,798,374 B2
(45) Date of Patent: Aug. 5, 2014

(54) AUTOMATED FACIAL ACTION CODING SYSTEM

(75) Inventors: Marian Stewart Bartlett, San Diego, CA (US); Gwen Littlewort-Ford, Solana Beach, CA (US); Javier Movellan, La Jolla, CA (US); Ian Fasel, Tucson, AZ (US); Mark Frank, East Amherst, NY (US)

(73) Assignees: The Regents of the University of California, Oakland, CA (US); The Research Foundation of State University of New York, Amherst, NY (US)

( * ) Notice: Subject to any disclaimer, the term of this patent is extended or adjusted under 35 U.S.C. 154(b) by 1209 days.

(21) Appl. No.: 12/548,294

(22) Filed: Aug. 26, 2009

(65) Prior Publication Data

US 2010/0086215 A1   Apr. 8, 2010

Related U.S. Application Data

(60) Provisional application No. 61/092,032, filed on Aug. 26, 2008.

(51) Int. Cl.
*G06K 9/62* (2006.01)
*G06K 9/48* (2006.01)

(52) U.S. Cl.
USPC ............ 382/197; 382/118; 382/209; 382/224

(58) Field of Classification Search
USPC .......................... 382/118, 197, 224, 190, 209
See application file for complete search history.

(56) References Cited

U.S. PATENT DOCUMENTS

| | | | | |
|---|---|---|---|---|
| 5,774,591 A * | 6/1998 | Black et al. | ................... | 382/236 |
| 8,219,438 B1 * | 7/2012 | Moon et al. | ................... | 705/7.29 |
| 2004/0039483 A1 * | 2/2004 | Kemp et al. | ................... | 700/245 |
| 2008/0260212 A1 * | 10/2008 | Moskal et al. | ................ | 382/118 |
| 2012/0010735 A1 | 1/2012 | Gilboa | | |

OTHER PUBLICATIONS

Zhang et al., "Active and Dynamic Information Fusion for Facial Expression Understanding from Image Sequences" IEEE Transactions on Pattern Analysis and Machine Intelligence, vol. 27, No. 5, May 2005, pp. 699-714.*

* cited by examiner

*Primary Examiner* — Kim Vu
*Assistant Examiner* — Michael Vanchy, Jr.
(74) *Attorney, Agent, or Firm* — Mintz Levin Cohn Ferris Glovsky and Popeo, P.C.

(57) ABSTRACT

An automatic facial action coding system and method can include processing an image to identify a face in the image, to detect and align one or more facial features shown in the image, and to define one or more windows on the image. One or more distributions of pixels and color intensities can be quantified in each of the one or more windows to derive one or more two-dimensional intensity distributions of one or more colors within the window. The one or more two-dimensional intensity distributions can be processed to select image features appearing in the one or more windows and to classify one or more predefined facial actions on the face in the image. A facial action code score that includes a value indicating a relative amount of the predefined facial action occurring in the face in the image can be determined for the face in the image for each of the one or more predefined facial actions.

22 Claims, 7 Drawing Sheets

500

| AU | Name | N | P | Hit | FA | A' |
|---|---|---|---|---|---|---|
| 1 | Inn. brow raise | 409 | 92 | 86 | 7 | 95 |
| 2 | Out. brow raise | 315 | 88 | 85 | 12 | 92 |
| 4 | Brow lower | 412 | 89 | 76 | 9 | 91 |
| 5 | Upper lid raise | 286 | 92 | 88 | 7 | 96 |
| 6 | Cheek raise | 278 | 93 | 86 | 6 | 96 |
| 7 | Lower lid tight | 403 | 88 | 89 | 12 | 95 |
| 9 | Nose wrinkle | 68 | 100 | 88 | 0 | 100 |
| 10 | Lip Raise | 50 | 97 | 29 | 2 | 90 |
| 11 | Nasolabial | 39 | 94 | 33 | 4 | 74 |
| 12 | Lip crnr. pull | 196 | 95 | 93 | 5 | 98 |
| 14 | Dimpler | 32 | 99 | 20 | 0 | 85 |
| 15 | Lip crnr. depr. | 100 | 85 | 85 | 14 | 91 |
| 16 | Lower Lip depr. | 47 | 98 | 29 | 1 | 92 |
| 17 | Chin raise | 203 | 89 | 86 | 10 | 93 |
| 20 | Lip stretch | 99 | 92 | 57 | 6 | 84 |
| 23 | Lip tighten | 57 | 91 | 42 | 8 | 70 |
| 24 | Lip press | 49 | 92 | 64 | 7 | 88 |
| 25 | Lips part | 376 | 89 | 83 | 9 | 93 |
| 26 | Jaw drop | 86 | 93 | 58 | 5 | 85 |
| 27 | Mouth stretch | 81 | 99 | 100 | 1 | 100 |
| Mean | | | 90.9 | 80.1 | 8.2 | 92.6 |

P is the percent agreement with Human FACS codes (positive and negative examples classed correctly). Hit is the positive hit rate while FA is the false alarm rate. A' is the are under the ROC.

FIG. 5

| Action Unit | Area under the ROC |
|---|---|
| 1 | 85.9 |
| 2 | 85.0 |
| 4 | 82.3 |
| 5 | 83.2 |
| 9 | 85.3 |
| 10 | 80.1 |
| 12 | 92.1 |
| 14 | 81.5 |
| 15 | 88.1 |
| 17 | 88.4 |
| 20 | 74.4 |
| Mean | 84.2 |

AUTOMATED FACIAL ACTION CODING SYSTEM

CROSS-REFERENCE TO RELATED APPLICATION

This application claims the benefit of U.S. Provisional Patent Application Ser. No. 61/092,032, filed on Aug. 26, 2008 and entitled "Automated Facial Action Coding System," the specification and figures of which are incorporated by reference herein in their entirety.

STATEMENT OF GOVERNMENT SPONSORED SUPPORT

This invention was made with government support under grant No. CA127622 and grant No. CNS-0454233 awarded by the National Science Foundation. The government has certain rights in the invention.

TECHNICAL FIELD

The subject matter described herein relates generally to facial action coding, computer vision, automatic recognition of facial expression, and more particularly to real time recognition of facial actions.

BACKGROUND

Protocols such as the Facial Action Coding System (FACS), a method for measuring facial behaviors developed by Paul Ekman, Wallace Friesen, and Joseph Hager, identify specific changes to facial expressions that occur with muscular contractions and quantify how the contraction of each facial muscle (singly and in combination with other muscles) changes the appearance of the face. Observed changes in the appearance of the face are associated with the action of muscles that produce them to create a reliable means for determining the category or categories in which each facial behavior belongs. FACS observations are quantified in measurement units known as Action Units (AUs). Some facial appearances include motions of more than one muscle whose effects on observed changes in facial appearance are not readily distinguishable. In other instances, the relatively independent actions of different parts of the same muscle or muscles participate in distinct facial actions. Using FACS, an observed facial expression or action is decomposed into the specific AUs that produced the movement. A facial expression is thereby given a score that includes the list of AUs that produced it.

FACS provides an objective and comprehensive language for describing facial expressions and relating them back to what is known about their meaning from the behavioral science literature. Because it is comprehensive, FACS also allows for the discovery of new patterns related to emotional or situational states. Spontaneous facial expressions differ from posed expressions both in the muscles moved and the dynamics of the muscle movements. Having subjects pose states such as comprehension and confusion is of limited use since there is a great deal of evidence that people do different things with their faces when posing versus during a spontaneous experience. Likewise, subjective labeling of expressions can also be less reliable than objective coding for finding relationships between facial expression and other state variables.

FACS has enabled discovery of new relationships between facial movement and internal state. For example, early studies of smiling focused on subjective judgments of happiness, or on just the mouth movement (e.g., zygomatic major). These studies were unable to show a reliable relationship between expression and other measures of enjoyment, and it was not until experiments with FACS measured facial expressions more comprehensively that a strong relationship was found: namely that smiles which featured both orbicularis oculi (AU6), as well as zygomatic major action (AU 12), were correlated with self-reports of enjoyment, as well as different patterns of brain activity, whereas smiles that featured only zygomatic major (AU12) were not. Research based upon FACS has also shown that facial actions can show differences between genuine and faked pain, and between those telling the truth and lying at a much higher accuracy level than naive subjects making subjective judgments of the same faces. Facial actions can predict the onset and remission of depression, schizophrenia, and other psychopathology, can discriminate suicidal from non-suicidal depressed patients, and can predict transient myocardial ischemia in coronary patients. FACS has also been able to identify patterns of facial activity involved in alcohol intoxication that observers not trained in FACS failed to note.

Although FACS has a proven record for the scientific analysis of facial behavior, the process of applying FACS to videotaped behavior is currently done by hand. This limitation has been identified as one of the main obstacles to doing research on emotion. FACS coding is currently performed by trained experts who make perceptual judgments of video sequences, often frame by frame. It requires approximately 100 hours to train a person to make these judgments reliably and to pass a standardized test for reliability. It then typically takes over two hours to code comprehensively one minute of video. Furthermore, although humans can be trained to code reliably the morphology of facial expressions (which muscles are active), it can be quite difficult to code the dynamics of the expression (the activation and movement patterns of the muscles as a function of time). Such expression dynamics, not just static morphology, may provide important information. For example, spontaneous expressions have a fast and smooth onset, with distinct facial actions peaking simultaneously, whereas posed expressions tend to have slow and jerky onsets, and the actions typically do not peak simultaneously.

The importance of spontaneous behavior for developing and testing computer vision systems becomes apparent when the neurological substrate for facial expression is examined. There are two distinct neural pathways that mediate facial expressions, each one originating in a different area of the brain. Volitional facial movements originate in the cortical motor strip, whereas the more involuntary, emotional facial actions, originate in the subcortical areas of the brain. Research documenting these differences was sufficiently reliable to become the primary diagnostic criteria for certain brain lesions prior to modern imaging methods. The facial expressions mediated by these two pathways have differences both in which facial muscles are moved and in their dynamics. The two neural pathways innervate different facial muscles, and there are related differences in which muscles are moved when subjects are asked to pose an expression such as fear versus when it is displayed spontaneously. Subcortically initiated facial expressions (the involuntary group) are characterized by synchronized, smooth, symmetrical, consistent, and reflex-like facial muscle movements whereas cortically initiated facial expressions are subject to volitional real-time control and tend to be less smooth, with more variable dynamics. However, precise characterization of spontaneous expression dynamics has been slowed down by the need to use non-invasive technologies (e.g. video), and the difficulty of manually coding expression intensity frame-by-frame. Thus, the importance of video based automatic coding systems.

These two pathways appear to correspond to the distinction between biologically driven versus socially learned facial behavior. Researchers agree, for the most part, that most types of facial expressions are learned like language, displayed under conscious control, and have culturally specific meanings that rely on context for proper interpretation. Thus, the same lowered eyebrow expression that would convey "uncertainty" in North America might convey "no" in Borneo. On the other hand, there are a limited number of distinct facial expressions of emotion that appear to be biologically wired, produced involuntarily, and whose meanings are similar across all cultures; for example, anger, contempt, disgust, fear, happiness, sadness, and surprise. A number of studies have documented the relationship between these facial expressions of emotion and the physiology of the emotional response. There are also spontaneous facial movements that accompany speech. These movements are smooth and ballistic, and are more typical of the subcortical system associated with spontaneous expressions. There is some evidence that arm-reaching movements transfer from one motor system when they require planning to another when they become automatic, with different dynamic characteristics between the two. It is unknown whether the same thing happens with learned facial expressions. An automated system would enable exploration of such research questions.

SUMMARY

In one aspect, a method implemented on one or more processors includes detecting automatically the location of a face and one or more facial features in an image, extracting from the image at least part of the image corresponding to the face, aligning the part of the image based on the one or more detected facial features, and defining one or more image windows at a plurality of locations of the face. The one or more image windows can optionally include image windows having two or more different scales or sizes. One or more image filters are applied to each of the one or more image windows to produce a set of characteristics or parameters representing contents of the image window. Outputs of the one or more image filters are processed for the one or more image windows using a feature selection stage implemented on the one or more processors. The feature selection stage chooses a subset of the characteristics or parameters to pass to the classification stage. A relative likelihood of each of a plurality of facial action units is estimated, optionally by a classification stage, based on the subset of characteristics or parameters measured from the one or more image windows. A score vector based on a combination of the relative likelihoods for the one or more windows is produced for the image. The score vector includes a value for each of the plurality of action units and quantifies a probability of a presence of each of the plurality of action units in the face shown in the image. The score vector is then promoted.

In an interrelated aspect, a method includes processing an image to identify a face in the image, to detect and align one or more facial features shown in the image, and to define one or more windows on the image; quantifying one or more distributions of pixels and color intensities in each of the one or more windows to derive one or more two-dimensional intensity distributions of one or more colors within the region; processing the one or more two-dimensional intensity distributions to select facial features appearing in the one or more windows and to classify one or more predefined facial actions on the face in the image; determining a facial action code score for the face in the image for each of the one or more predefined facial actions; and promoting a vector comprising the facial action code scores for all of the one or more predefined facial actions. The facial action code score for each of the one or more predefined facial actions includes a value indicating a relative amount of the predefined facial action occurring in the face in the image.

In another interrelated aspect, a system includes one or more processors that execute one or more software modules that include an image pre-processor module, a filter bank module, a feature selection module, a classifier module, and a super-ordinate classifier module. The image pre-processor module detects automatically the location of a face and one or more facial features in an image, extracts from the image at least part of the image corresponding to the face, aligns the part of the image based on the one or more detected facial features, and defines one or more image windows at one or more locations of the face. The plurality of image windows include image windows having two or more different scales or sizes. The filter bank module applies one or more image filters to each of the one or more image windows to produce a set of characteristics or parameters representing contents of the image window. The feature selection module processes outputs of the filter bank module for the one or more windows and chooses a subset of the characteristics or parameters to pass to the classification stage. The classification stage estimates a relative likelihood of each of a plurality of facial action units based on the characteristics or parameters measured from the one or more image windows. The classifier module produces for the image a score vector based on a combination of the relative likelihoods for the one or more windows. The super-ordinate classifier module produces for the image a score vector based on a combination of the relative likelihoods for the one or more windows. The score vector includes a value for each of the plurality of action units and quantifies a probability of a presence of each of the plurality of action units in the face shown in the image.

In some variations one or more of the following can optionally be included. The classification stage or module can estimate the relative likelihood of each of the plurality of facial action units for each of the one or more image windows using a machine learning technique trained on a database of spontaneous expressions by subjects that have been labeled for facial actions based on a facial action coding system. The classifier process can use machine learning on a database of spontaneous facial expressions to determine the score vector.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The subject matter described herein provides many advantages, including but not limited to an efficient and objective approach for generating standard video databases to train and evaluate systems for automatic recognition of facial expressions.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 5 is a table showing data from an example of an analysis using the current subject matter;

FIG. 7 is a table showing action unit recognition performance (area under the ROC) for spontaneous facial actions based on frame-by-frame performance on the RU-FACS dataset.

When practical, similar reference numbers denote similar structures, features, or elements.

DETAILED DESCRIPTION

Figure 1:
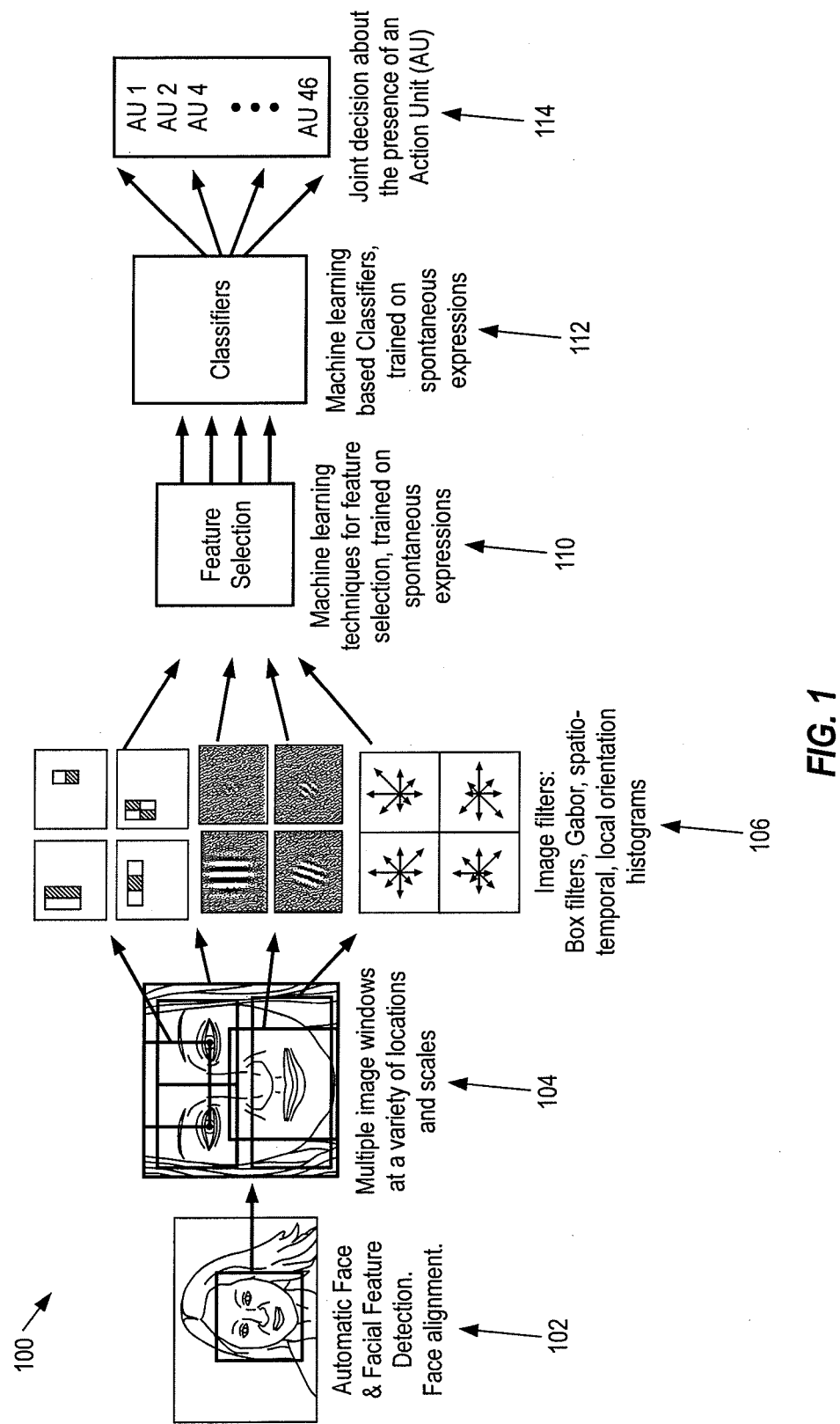
FIG. 1 is a pictorial flow chart illustrating a method of automatic facial action coding.

The subject matter described herein provides methods, systems, apparatus, techniques, articles of manufacture, and the like that can be used to generate a database of coded spontaneous facial expressions. In some examples, the database can be coded using the Facial Action Coding System (FACS).

Objective coding with FACS is one approach to the problem of developing detectors for state variables such as comprehension and confusion. Machine learning of classifiers from a database of spontaneous examples of subjects in these states is another possible approach. Creation of such a database generally requires eliciting the state and assessing whether and to what degree the subject is experiencing the desired state. Once a database exists in which a state has been elicited, machine learning can be applied either directly to image primitives, or to facial action codes. It is yet not clear whether intermediate representations such as FACS are the best approach to recognition. Regardless of which approach is more effective, FACS provides a general purpose representation that can be useful for many applications. It would be time consuming to collect a new database of facial expression samples of each mental state of interest, and train application-specific detectors directly from image primitives for each new application.

In various implementations of the current subject matter, a system and method for facial action coding of spontaneous expressions can provide real time recognition of facial actions from the Facial Action Coding System (FACS). The current subject matter can automatically detect frontal faces in the video stream and scores each frame with respect to a list of action units used to identify facial actions, for example the 46 Action units defined by FACS. Other protocols for identifying facial actions can also be used. The current subject matter can further be used in classifying expressions of basic emotions. One or more analytical techniques, including but not limited to machine learning algorithms such as AdaBoost, support vector machines, linear discriminant analysis, feature selection techniques, and the like, can be used to classify the emotions associated with observed facial actions or expressions. In one example, a subset of Gabor filters can be selected using AdaBoost and then training support vector machines can be trained on the outputs of the filters selected by AdaBoost.

One of the ways the subject matter described herein differs from past approaches is that instead of designing special purpose image features for each facial action, a machine learning technique is employed for data-driven facial expression classification. These machine-learning algorithms can be applied to image-based representations. Image-based machine learning methods are highly effective for machine recognition tasks such as face detection, and do not suffer from drift, which is a major obstacle to tracking methods. Moreover, the subject matter described herein can also use such systems to capture information about action unit intensity that can be employed for analyzing facial expression dynamics. The image-based representation can be the output of a bank of Gabor filters, although applied machine learning can be used on the image features as well. The Gabor features can be related to those developed by machine learning. Learned classifiers taking such representations as input can be sensitive not only to changes in position of facial features, but also to changes in image texture such as those created by wrinkles, bulges, and changes in feature shapes. In some implementations, image-based representations contain more information for facial expression than representations based on the relative positions of a finite set of facial features. For example, the subject matter described herein relating to a basic emotion recognizes can provide a higher performance on the Cohn-Kanade dataset than an upper-bound on feature tracking computed by another group based on manual feature point labeling. Feature-point tracking can be distinguished from the general category of motion-based representations. Motion can be described with spatio-temporal Gabor filters, for example. In a further implementation, image-based and motion-based representations can be combined to provide a powerful analytical tool.

In some implementations, the subject matter described herein relates to a real-time face detection system that employs boosting techniques in a generative framework. Enhancements can include, for example, employing Gentleboost instead of AdaBoost, smart feature search, and a novel cascade training procedure, combined in a generative framework. Source code for the face detector is freely available at http://kolmogorov.sourceforge.net. Accuracy on the Carnegie Mellon University-Massachusetts Institute of Technology (CMU-MIT) dataset, a standard public data set for benchmarking frontal face detection systems, is 90% detections and 1/million false alarms, which is state-of-the-art accuracy. The CMU-MIT test set has unconstrained lighting and background. With controlled lighting and background, such as the facial expression data employed here, detection accuracy is much higher. All faces in the training datasets, for example, can be successfully detected using the current subject matter. The system can operate in some examples at 24 frames/second on a 3 GHz Pentium IV for 320×240 images.

FIG. 1 is a pictorial flow chart 100 showing a process for facial action coding in accordance with an implementation of the current subject matter. At 102, the location of the face and facial features, for example the mouth, eyes, nose, etc., are automatically detected in an image or, alternatively, in a series of images, such as a video. The part of the image corresponding to the face is extracted from the image and aligned based on the detected facial features. For the purposes of this disclosure, an image can be any kind of data that represent a visual depiction of a subject, such as a physical object or a person. For example, the term includes all kind of digital image formats, including but not limited to any binary or other computer-readable data representation of a two-dimensional image.

After the face is extracted and aligned, at 104 a collection of one or more windows is defined at several locations of the face, and at different scales or sizes. One or more image filters is applied to each of the image windows at 106 to produce a set of characteristics or parameters representing contents of each image window. The specific image filter or filters used can be selected using machine learning methods from a general pool of image filters that can include but are not limited to Gabor filters, Box filters (also called integral image filters or Haar filters), and Local Orientation Statistics filters. In some variations, the plurality of image filters can include a combination of filters, each of which extracts different aspects of the image relevant to facial action recognition. The combination of filters can optionally include two or more of box filters (also known as integral image filters, or Haar wavelets), Gabor filters, motion detectors, spatio-temporal filters, and local orientation filters (e.g. SIFT, Levi-Weiss).

The image filter outputs are passed to a feature selection stage 110. The feature selection stage, whose parameters are found using machine learning methods, can include the use of a machine learning technique that is trained on a database of spontaneous expressions by subjects that have been labeled for facial actions from the Facial Action Coding System. The feature selection stage 110 processes the image filter outputs for each of the plurality of image windows to choose a subset of the characteristics or parameters to pass to the classification stage. The feature selection stage 110 results for the two or more image windows can optionally be combined and processed by a classifier process 112 to produce a joint decision regarding the posterior probability of the presence of an action unit in the face shown in the image. The classifier process can utilize machine learning on the database of spontaneous facial expressions. At 114, a promoted output of the process 100 can be a score for each of the action units that quantifies the observed "content" of each of the action units in the face shown in the image.

In some implementations, the process 100 can use spatio-temporal modeling of the output of the frame-by-frame AU (action units) detectors. Spatio-temporal modeling includes, for example, Hidden Markov Models, Conditional random fields, Conditional Kalman filters, and temporal wavelet filters, such as temporal Gabor filters, on the frame by frame system outputs.

In one example, the automatically located faces can be rescaled, for example to 96×96 pixels. Other sizes are also possible for the rescaled image. In a 96×96 pixel image of a face, the typical distance between the centers of the eyes can in some cases be approximately 48 pixels. Automatic eye detection can be employed to align the eyes in each image before the image is passed through a bank of image filters (for example Gabor filters with 8 orientations and 9 spatial frequencies (2:32 pixels per cycle at ½ octave steps). Output magnitudes can then be passed to the feature selector and facial action code classifier. Spatio-temporal Gabor filters can also be used as filters on the image windows.

In addition, in some implementations, the process 100 can use spatio-temporal modeling for temporal segmentation and event spotting to define and extract facial expression events from the continuous signal (e.g., series of images forming a video), including onset, expression apex, and offset. Moreover, spatio-temporal modeling can be used for estimating the probability that a facial behavior occurred within a time window. Artifact removal can be used by predicting the effects of factors, such as head pose and blinks, and then removing these features from the signal.

Figure 2:
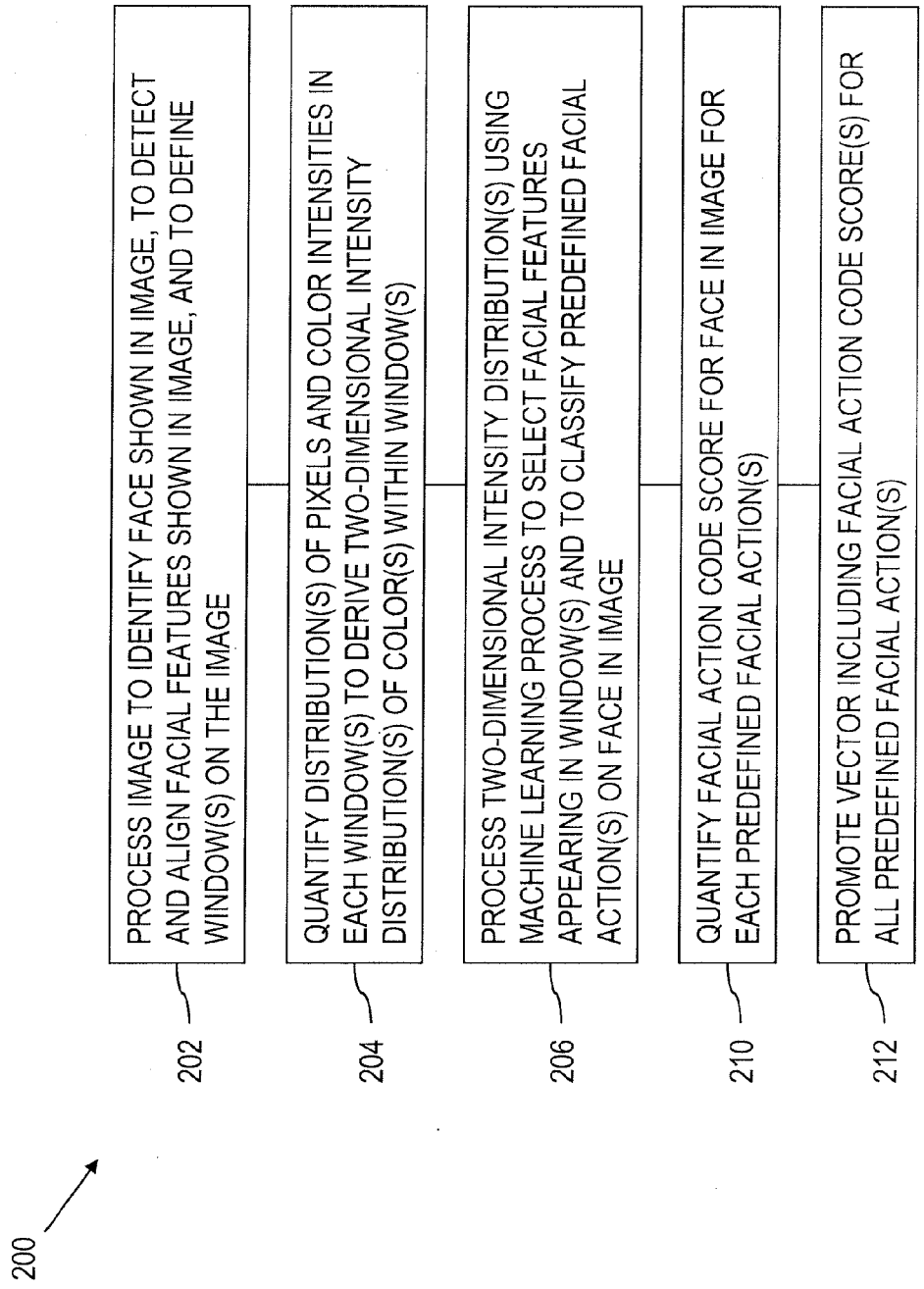
FIG. 2 is a flow chart illustrating a method of automatic facial action coding

FIG. 2 shows a flow chart 200 illustrating another implementation of the current subject matter. At 202, an image is processed to identify a face that is shown in the image, to detect and align one or more facial features shown in the image, and to define one or more windows on the image. At 204, one or more distributions of pixels and color intensities are quantified in each of the one or more windows to derive one or more two-dimensional intensity distributions of one or more colors within the window or windows. The one or more two-dimensional intensity distributions are processed at 206 using a machine learning process to select facial features appearing in the one or more windows and to classify one or more predefined facial actions on the face in the image. At 210, a facial action code score is quantified for the face in the image for each of the one or more predefined facial actions. The facial action code score for each of the one or more predefined facial actions includes a value indicating a relative amount of the predefined facial action occurring in the face in the image. At 212, a vector that includes the facial action code scores for all of the one or more predefined facial actions is promoted. The promoting can optionally include displaying the data contained in the vector as a printout or on a user interface shown on a display. Alternatively, the promoting can include storing the vector on a computer readable medium or in a database for future use. The printout or display of the vector data can be in any form, for example as a list of numbers or as a graph showing the relative content of each facial action code score.

In a further implementation, the promoted vector can be further processed using machine learning or another processing step to associate the vector data with one or more emotions, situations, feelings, thoughts, problems, or the like that were experienced by the person whose face is shown in the image.

Spontaneous facial expressions differ from posed expressions in both which muscles are moved, and in the dynamics of the movement. Advances in the field of automatic facial expression measurement generally involve development and assessment on spontaneous behavior. The subject matter described herein relates to the task of facial action detection in spontaneous facial expressions in addition to posed expressions. A user independent system can be employed for real time recognition of facial actions from the Facial Action Coding System (FACS). The FACS system automatically detects frontal faces in the video stream and coded each frame with respect to 20 Action units. This approach applies machine-learning methods, such as support vector machines and AdaBoost, to texture-based image representations. The output margin for the learned classifiers predicts action unit intensity. Specifically, for support vector machines, the distance to the separating hyperplane (the margin) predicts action unit intensity, and for AdaBoost, the likelihood ratio (the likelihood of target relative to the likelihood of non-target) predicts action unit intensity. Frame-by-frame intensity measurements will enable investigations into facial expression dynamics, which were previously intractable by human coding.

Figure 3:
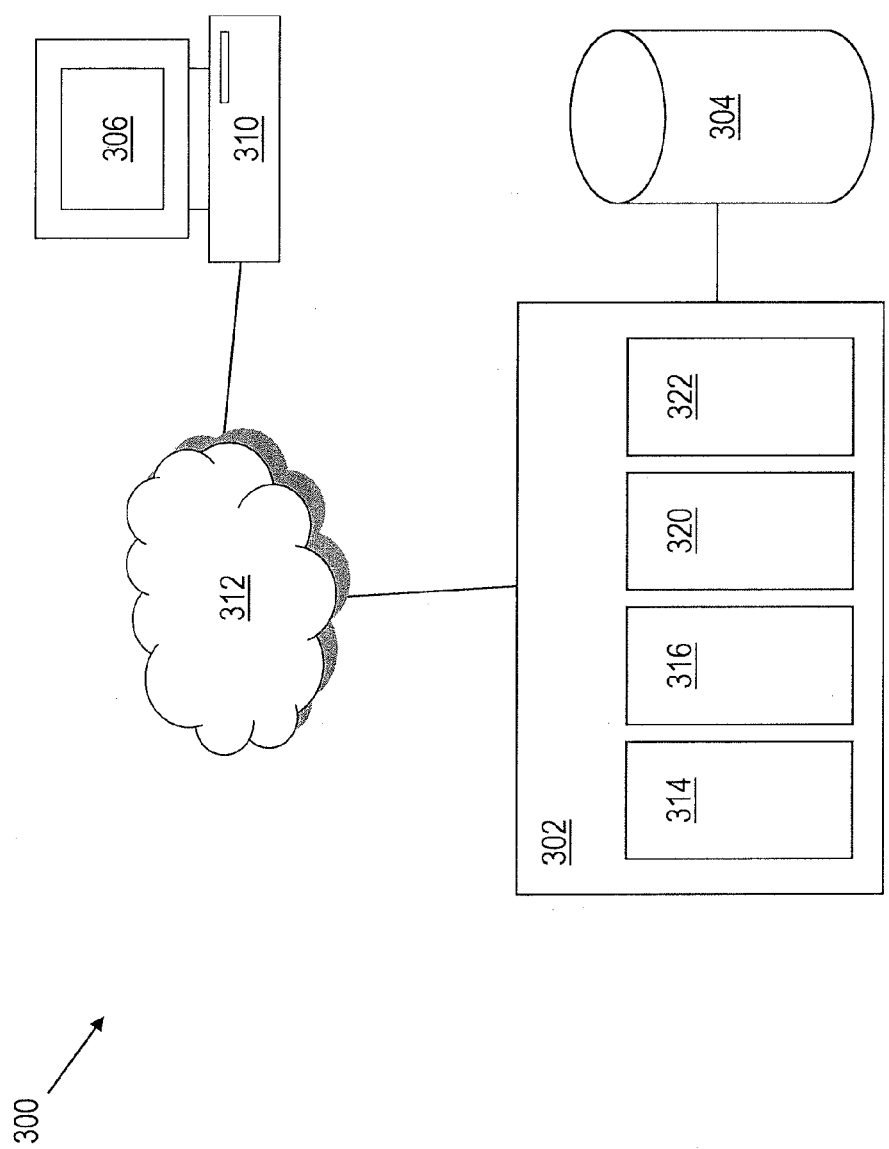
FIG. 3 a block diagram of an exemplary facial action coding system.

A system 300 for automatic facial action coding according to an implementation is shown in FIG. 3 and can include at least one processor 302 that communicates with or includes a database of spontaneous facial expressions 304. An optional user interface 306 can be provided on an optional computer 310 that communicates with the processor. The computer 310 can be a remote computer that communicates with the processor 302 over a network 312 as shown in FIG. 3. Alternatively, the computer 310 can be collocated with the one or more processors 302. In another variation, a user interface 306 can be provided via a display coupled directly to the one or more processors 302. The one or more processors 302 implement an image pre-processing module 314, a filter bank module 316, a feature selection module 320, and a facial action classifier module 322.

The image pre-processing module 314 processes an image received at the one or more processors to identify a face in the image, to detect and align one or more facial features shown in the image, and to define one or more windows on the image. The image can be received by one or more of a variety of inputs, including but not limited to accessing the database 304 or one or more other databases, either locally or via the network 312, by reading from a computer readable medium such as a computer memory or portable storage device, by optically scanning from a physical hard copy of the image, or the like. The image pre-processing module 314 can also optionally extract from the image at least part of the image corresponding to the face and align the at least part of the image based on the one or more detected facial features. Additionally, the image pre-processing module can define a plurality of image windows with two or more different scales or sizes and being located at a plurality of locations of the face. The filter bank module 316 quantifies one or more distributions of pixels and color intensities in each of the one or more windows to derive one or more two-dimensional intensity distributions of one or more colors within the region. Alternatively or in addition, the filter bank module can produce a set of characteristics or parameters representing contents of the image window.

The feature selection module 320 chooses a subset of the characteristics or parameters from the one or more image windows to pass to the classification stage. The facial action classifier module 322 employs machine learning approaches to estimate the relative likelihood of each of a plurality of facial action units based on the characteristics or parameters selected by the feature selection module. The facial action classifier module determines a facial action code score for the face in the image for each of the one or more predefined facial actions. The facial action code score includes a value indicating a relative amount of the predefined facial action occurring in the face in the image. Alternatively or in addition, the facial action classifier module 322 can produce a score vector based on a combination of the relative likelihoods for the plurality of windows. The score vector can include a value for each of the plurality of action units and quantify a probability of a presence of each of the plurality of action units in the face shown in the image.

While this system 300 has been described in terms of several modules implemented on one or more processors, it should be readily understood that the functions of one or more of the image pre-processing module 314, the filter bank module 316, the feature selection module 320, and the facial action classifier module 322 can be implemented in different ways, for example without modules or using a larger or smaller set of software subroutines. Such variations in the implementation of a system for automatic facial action coding are within the scope of the current subject matter.

Figure 4:
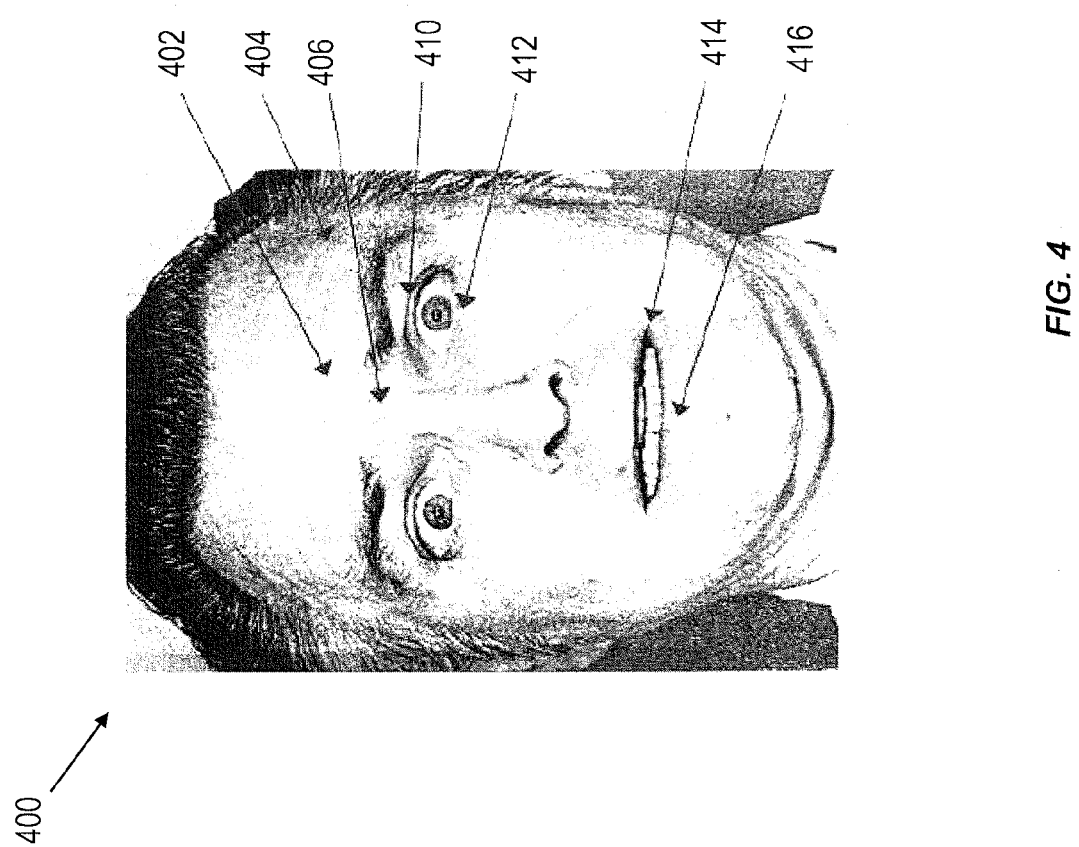
FIG. 4 is a photograph of a face illustrating examples of FACS codes for a prototypical expression of fear.

FIG. 4 is a labeled photograph of a face 400 showing some possible action codes that can be assigned to an expression of fear. Action codes can be assigned for raising of the inner brow (AU 1C) 402, raising of the outer brow (AU 2C) 404, contraction of the corrugator supercilii (AU 4B) 406, raising of the upper eyelid (AU 5D) 410, tightening of the lower eyelid (AU 7B) 412, stretching of the lip (AU 20B) 414, and dropping of the jaw (AU 26B) 416.

Figure 6:
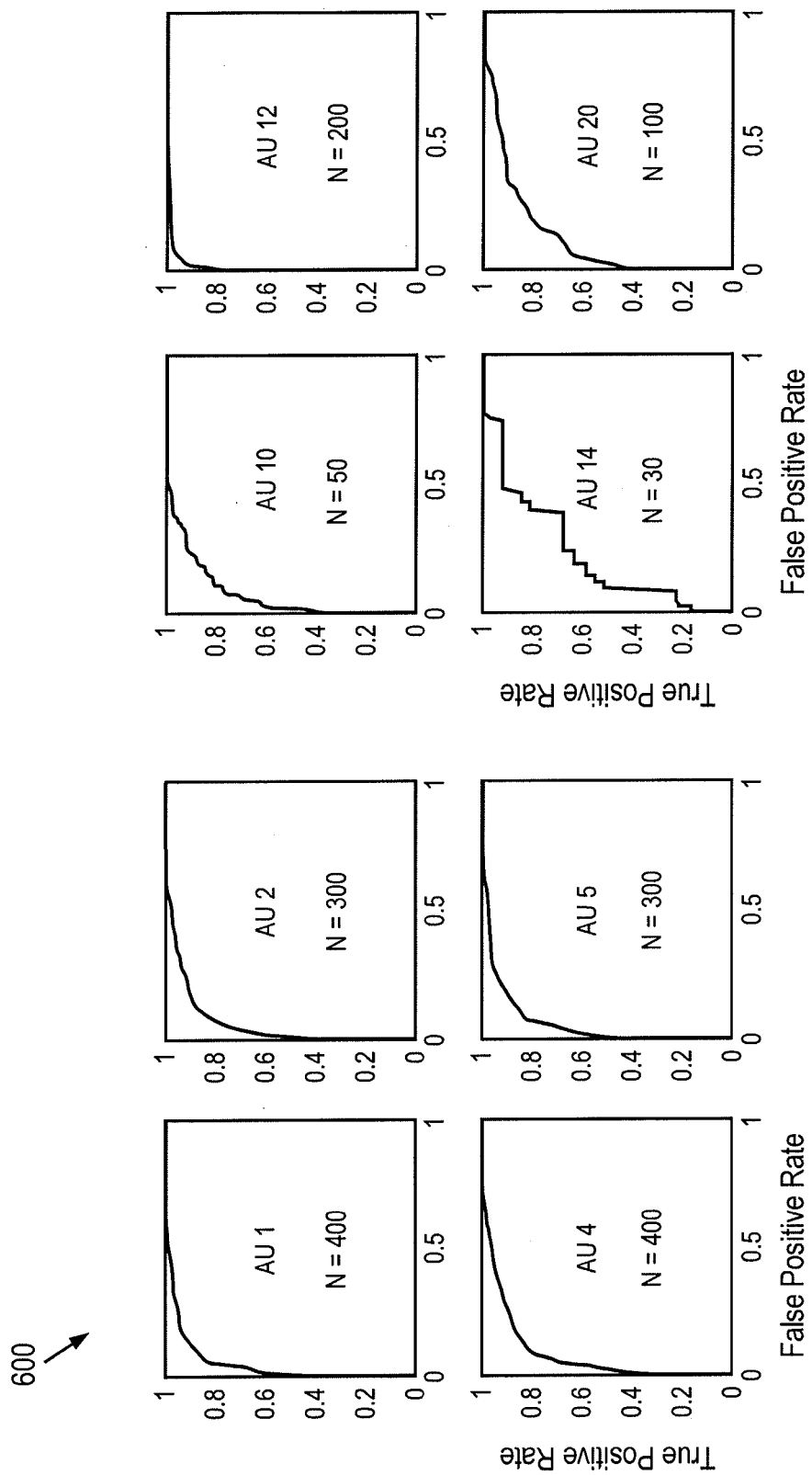
FIG. 6 is a set of charts showing receiver-operator characteristic (ROC) curves for 8 AU detectors, tested on posed expressions.

In a demonstration of the current subject matter, performance of a system such as that described herein was tested for generalization to novel subjects within the Cohn-Kanade and Ekman-Hager databases. Generalization to new subjects was tested using leave-one-subject-out cross-validation in which all images of the test subject were excluded from training. The table 500 of FIG. 5 shows results for fully automatic recognition of 20 facial actions using the AdaBoost classifier. System outputs were the output of a AdaBoost discriminant function for each AU. All system outputs above threshold were treated as detections. In this example, a mean of 91% agreement with human FACS labels was obtained. Overall percent correct can be an unreliable measure of performance, however, since it depends on the proportion of targets to non-targets, and also on the decision threshold. In this test, there were a far greater number of non-targets than targets, since targets were images containing the desired AU (N in FIG. 5) and non-targets were all images not containing the desired AU (2568-N). A more reliable performance measure is area under the ROC (receiver-operator characteristic) curve, such as those shown in FIG. 6. These curves are obtained by plotting hit rate (true positives) against false alarm rate (false positives) as the decision threshold varies. The area, A', under these curves is equivalent to percent correct in a 2-alternative forced choice task, in which the system must choose which of two options contains the target on each trial. The mean area under the curve for test on posed expressions was 92.6. FIG. 7 is a table 700 that lists ROC values for a set of action units based on a example implementation of the current subject matter.

The subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input.

The subject matter described herein can be implemented in a computing system that includes a back-end component, such as for example a data server, or that includes a middleware component, such as for example an application server, or that includes a front-end component, such as for example a client computer having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. Other implementations may be within the scope of the following claims.

What is claimed:

1. A method comprising:
    applying a plurality of image filters to each of a plurality of image windows defined at a plurality of locations in a face in an image to produce a set of descriptors representing contents of each of the plurality of image windows;
    processing outputs of the plurality of image filters for the plurality of image windows using a feature selection stage, the feature selection stage comprising choosing a subset of the set of descriptors for each of the plurality of image windows;
    estimating a first relative likelihood of a predefined facial action unit occurring in each of the plurality of image windows, the first relative likelihood for each of the plurality of image windows being based on the subset of the set of descriptors for each of the plurality of image windows; and
    producing a facial action code score for the face for the predefined facial action unit, the facial action code score quantifying a second relative likelihood of a presence of the predefined facial action unit in the face, the quantifying comprising combining the estimated first relative likelihoods for the plurality of image windows;
    wherein the applying, the processing, the estimating, and the producing are performed using computer hardware.

2. A method as in claim 1, wherein estimating the first relative likelihood of the predefined facial action unit for each of the plurality of image windows comprises using a machine learning technique trained on a database of spontaneous expressions by subjects that have been labeled for facial actions based on a facial action coding system.

3. A method as in claim 1, wherein the producing further comprises using machine learning on a database of spontaneous facial expressions to determine the facial action code score.

4. A method as in claim 1, wherein the predefined facial action unit comprises a plurality of predefined facial action units, the method further comprising applying a machine learning algorithm to a score vector to classify an emotion and/or cognitive state indicated by the face in the image, the machine learning algorithm having been trained on a database of facial expressions that links target emotions and/or cognitive states to the facial expressions in the database, the score vector comprising the facial action code score for the face for each of the plurality of predefined facial action units.

5. A method as in claim 4, wherein the machine learning algorithm is selected from a support vector machine, AdaBoost, discriminant analysis, and regression.

6. A method as in claim 1, wherein the plurality of image filters are selected from a pool of image filters comprising at least one of Gabor filters, Box filters, Local Orientation Statistics filters, spatiotemporal filters, and spatiotemporal Gabor filters.

7. A method as in claim 1, further comprising modeling the facial action code score of each of a plurality of images in a series of images, the series of images comprising the image, the modeling comprising a spatio-temporal modeling technique.

8. A method as in claim 7, wherein the spatio-temporal modeling technique comprises temporal segmentation and event spotting of the plurality of images in the series of images to define and extract facial expression events from the series of images.

9. A method as in claim 8, wherein the facial expression events comprise one or more of onset, apex, and offset of an expression on the face in the series of images.

10. A method as in claim 7, wherein the spatio-temporal modeling technique estimates a third relative likelihood that a facial behavior occurred within a time window.

11. A method as in claim 7, further comprising removing one or more artifacts from the series of images by predicting an effect of a facial movement and removing the effect from a signal generated from the series of images.

12. A method as in claim 11, wherein the facial movement comprises at least one of a head pose and a blink.

13. A method as in claim 1, wherein the feature selection stage comprises choosing the subset of the set of descriptors using a machine learning technique trained on a database comprising spontaneous facial expressions by subjects that have been labeled for facial actions based on a facial action coding system.

14. A method as in claim 1, further comprising:
    detecting automatically, in the image, a face location and one or more facial features;
    extracting from the image at least part of the image corresponding to the face;
    aligning the at least part of the image based on the one or more detected facial features; and defining the plurality of image windows at the plurality of locations in the face.

15. A method as in claim 1, wherein the plurality of image windows comprise image windows having two or more different scales.

16. A method as in claim 1, wherein the set of descriptors comprise at least one of characteristics and parameters.

17. A method as in claim 1, wherein the predefined facial action unit comprises a plurality of predefined facial action units, wherein the first relative likelihood for each image window comprises the first relative likelihood for each of the plurality of predefined facial action units, and wherein the facial action score comprises a score vector quantifying the second relative likelihood for each of the plurality of predefined facial action units.

18. A method as in claim 1, wherein the first relative likelihood comprises a first discriminant function, and wherein the second relative likelihood comprises a second discriminant function.

19. A method as in claim 1, wherein the plurality of image windows comprise at least two image windows that at least partially overlap such that the at least two image windows both include a same part of the face.

20. A non-transitory machine readable medium storing instructions that, when executed by at least one programmable processor, cause the at least one programmable processor to perform operations comprising:

applying a plurality of image filters to each of a plurality of image windows defined at a plurality of locations in a face in an image to produce a set of descriptors representing contents of each of the plurality of image windows;

processing outputs of the plurality of image filters for the plurality of image windows using a feature selection stage, the feature selection stage comprising choosing a subset of the set of descriptors for each of the plurality of image windows;

estimating a first relative likelihood of a predefined facial action unit occurring in each of the plurality of image windows, the first relative likelihood for each of the plurality of image windows being based on the subset of the set of descriptors for each of the plurality of image windows; and producing a facial action code score for the face for the predefined facial action unit, the facial action code score quantifying a second relative likelihood of a presence of the predefined facial action unit in the face, the quantifying comprising combining the estimated first relative likelihoods for the plurality of image windows.

21. A system comprising computer hardware providing operations comprising:

applying a plurality of image filters to each of a plurality of image windows defined at a plurality of locations in a face in an image to produce a set of descriptors representing contents of each of the plurality of image windows;

processing outputs of the plurality of image filters for the plurality of image windows using a feature selection stage, the feature selection stage comprising choosing a subset of the set of descriptors for each of the plurality of image windows;

estimating a first relative likelihood of a predefined facial action unit occurring in each of the plurality of image windows, the first relative likelihood for each of the plurality of image windows being based on the subset of the set of descriptors for each of the plurality of image windows; and producing a facial action code score for the face for the predefined facial action unit, the facial action code score quantifying a second relative likelihood of a presence of the predefined facial action unit in the face, the quantifying comprising combining the estimated first relative likelihoods for the plurality of image windows.

22. A system as in claim 21, wherein the computer hardware comprises a programmable processor and a non-transitory machine readable medium storing instructions that, when executed by the programmable processor, cause the programmable processor to provide the operations.

* * * * *